UNITED STATES PATENT OFFICE.

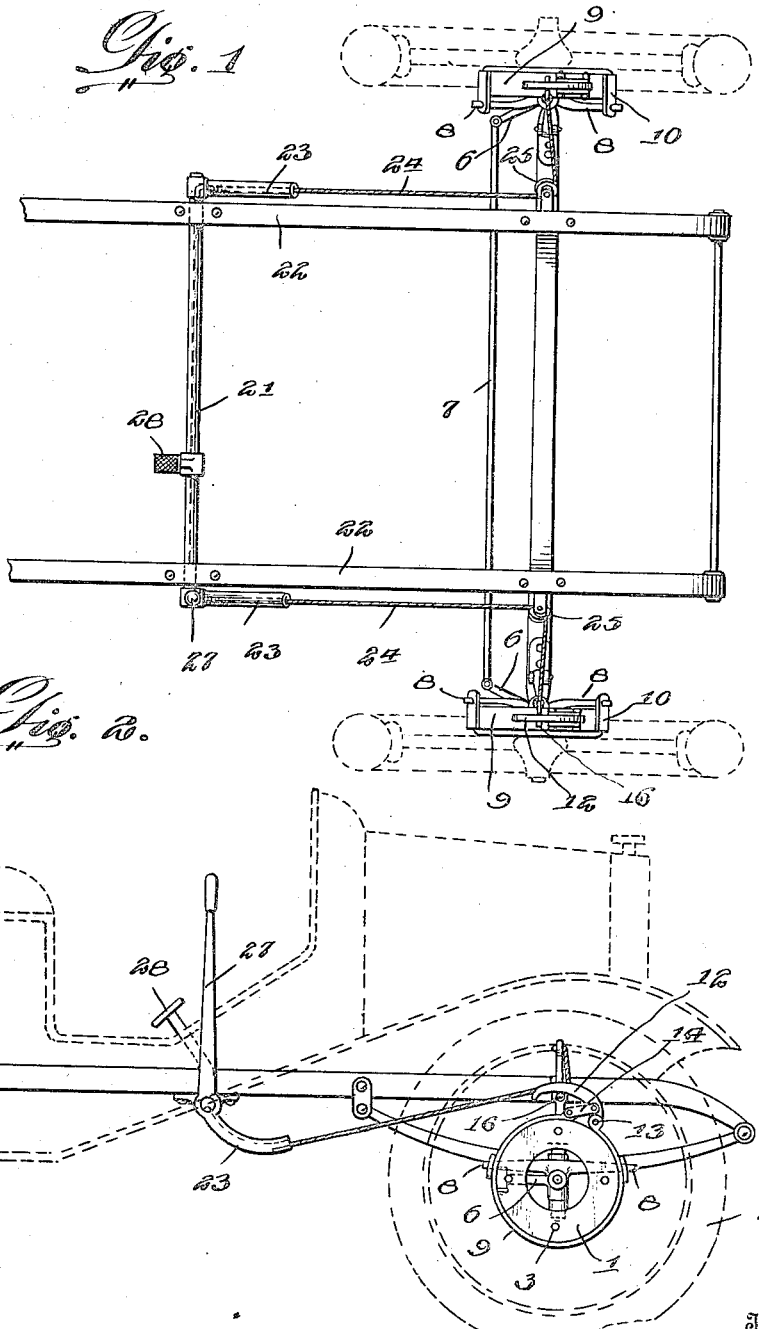

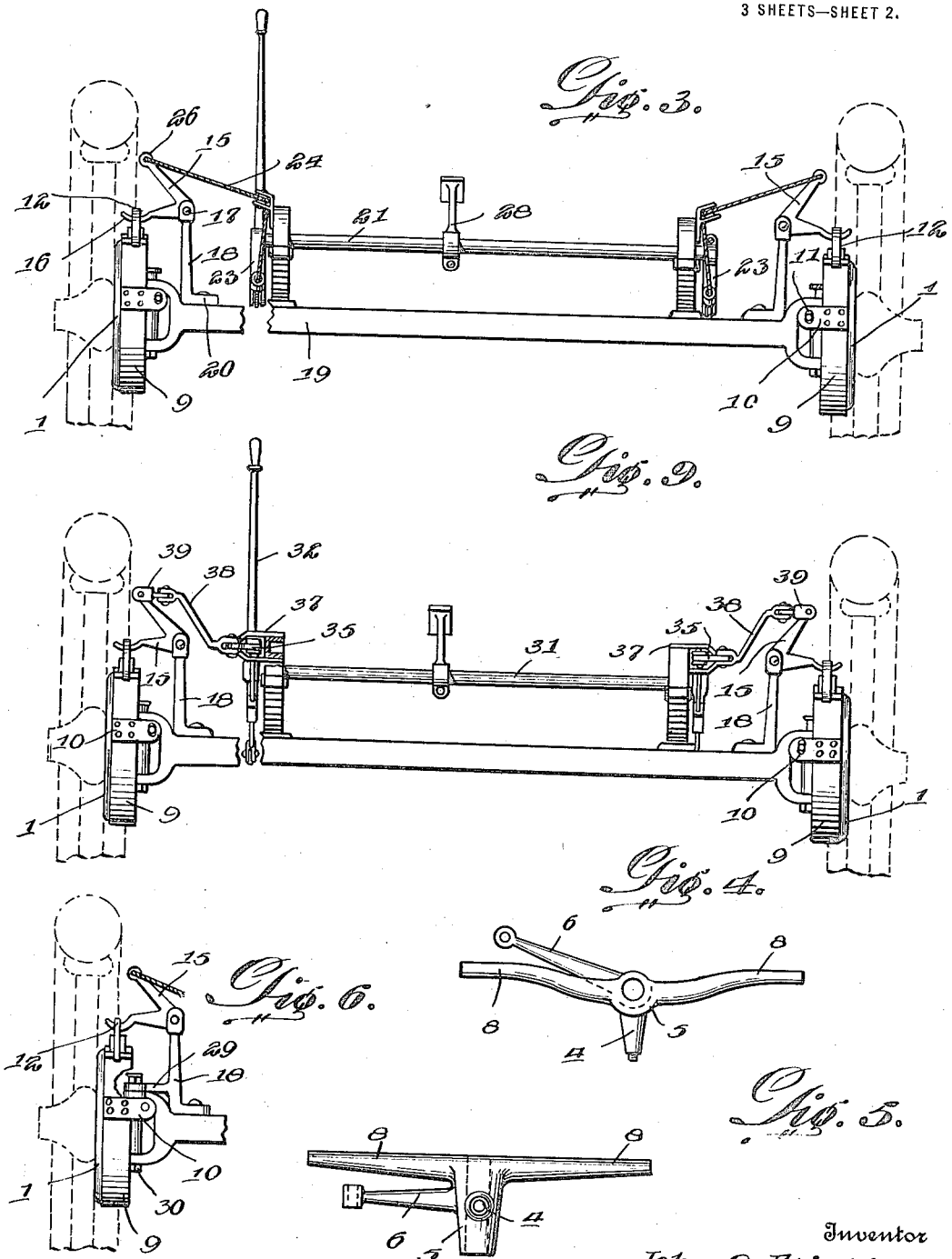

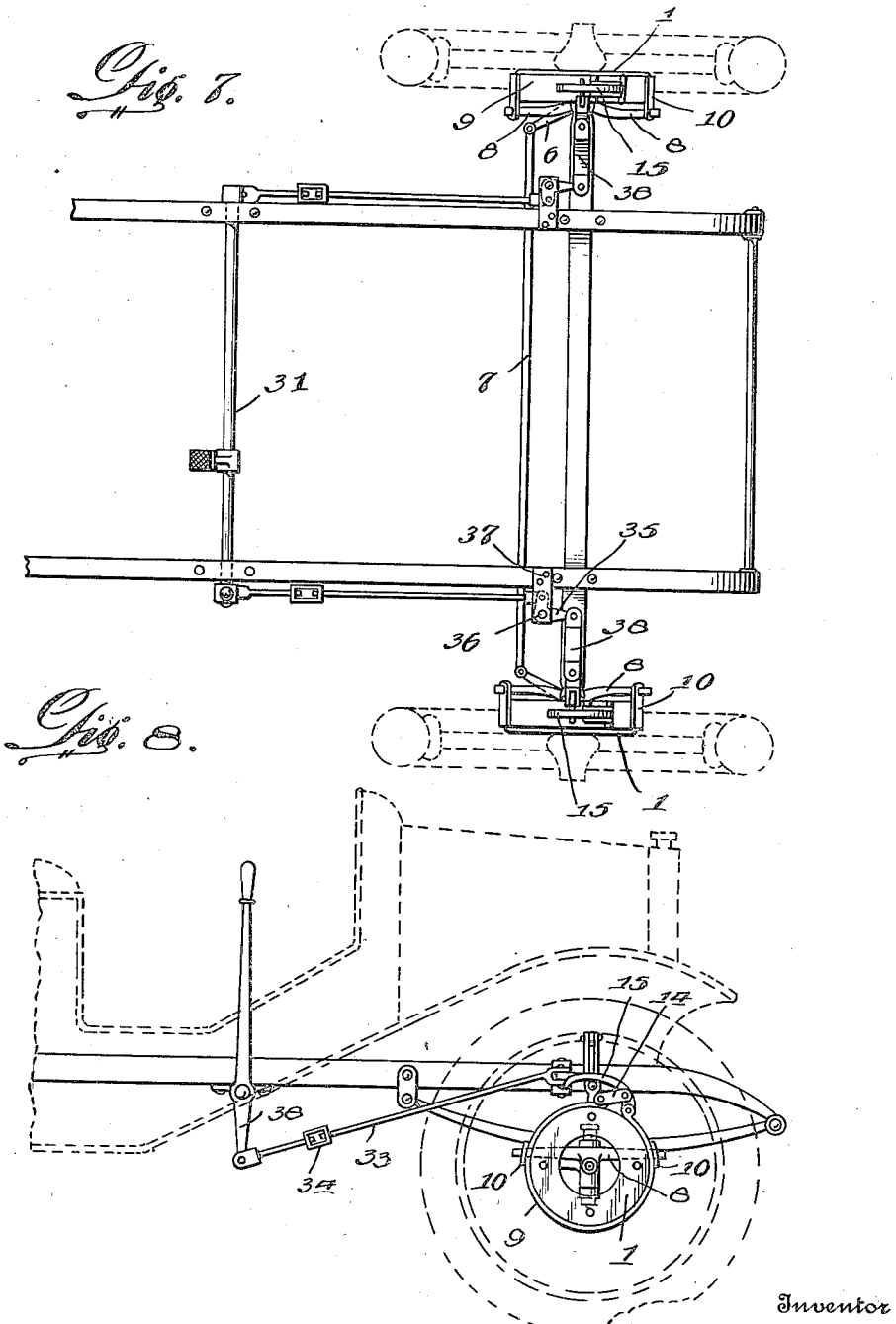

JOHN C. FLICKINGER, OF LEHIGHTON, PENNSYLVANIA, ASSIGNOR OF ONE-HALF TO JOHN A. ENGESSER, OF MAUCH CHUNK, PENNSYLVANIA.

STEERING-WHEEL BRAKE FOR AUTOMOBILES.

1,159,340.  Specification of Letters Patent.  Patented Nov. 2, 1915.

Application filed July 6, 1915. Serial No. 38,162.

*To all whom it may concern:*

Be it known that I, JOHN C. FLICKINGER, a citizen of the United States, residing at Lehighton, in the county of Carbon and State of Pennsylvania, have invented new and useful Improvements in Steering-Wheel Brakes for Automobiles, of which the following is a specification.

This invention relates to steering wheel brakes for motor vehicles the object of the invention being to produce practical, efficient and reliable brake mechanism for use in connection with the steering wheels of an automobile, the steering wheels in the present day construction of automobiles being arranged at the front of the machine and journaled on pivotally mounted steering knuckles carried by the opposite ends of the stationary and non-rotating front axle.

One of the principal objects of the present invention is to produce brake mechanism of the class above referred to which may be applied to any automobile, motor truck or the like so that the operation of the brake mechanism will not be interfered with by the turning of the steering wheels in either direction. The brake mechanism may be operated either by a hand lever or a foot lever, may be used in auxiliary relation to the brake mechanism with which the present day automobile is equipped, and adds greatly to the safety of the occupants of the machine.

With the above and other objects in view, the invention consists in the novel construction, combination and arrangement of parts, as herein described, illustrated and claimed.

In the accompanying drawings:—

Figure 1 is a top plan view of a sufficient portion of the chassis of a motor vehicle to illustrate the application of the steering wheel brake mechanism thereto. Fig. 2 is a side elevation of the same. Fig. 3 is a front elevation thereof. Fig. 4 is a plan view of one of the steering knuckles. Fig. 5 is a side elevation of the same looking toward the end of the spindle. Fig. 6 is a fragmentary front elevation showing a modified form of fulcrum post. Fig. 7 is a plan view similar to Fig. 1 showing another form of brake operating connections. Fig. 8 is a side elevation of the same. Fig. 9 is a front elevation thereof.

In carrying out the present invention brake drums 1 are secured to the steering wheels indicated at 2 in fixed relation to the latter, being bolted, riveted or otherwise fastened thereto as indicated at 3.

Each of the steering wheels 2 is journaled on the spindle 4 of the adjacent steering knuckle 5 provided with the usual knuckle arm 6, the oppositely located knuckle arms 6 being coupled together by the usual connecting rod 7. Each steering knuckle as best shown in Figs. 4 and 5 is provided with oppositely extending arms 8 forming the supporting means for the adjacent brake band 9 which is shown as encircling the respective brake drums 1 and provided with laterally extending lugs or ears 10 formed with slots or openings 11 which receive the opposite extremities of the arms 8 of the adjacent steering knuckle, each brake band 9 being thus supported by its respective steering knuckle so that when the wheel is turned in either direction, the working relation between the drum and brake band is maintained.

Referring now to Fig. 2 it will be seen that a toggle lever 12 is pivotally connected at 13 to one extremity of the brake band 9, said lever being curved in the direction of its length and overhanging the drum and other extremities of the brake band. A link 14 connects said other extremity of the brake band 9 with the lever 12 so that when the free end of the toggle lever is moved away from the drum, the brake band is contracted and thereby caused to frictionally engage the drum.

Referring now to Fig. 3, the means for actuating the toggle lever 12 is shown as consisting of a bell crank lever 15 one arm of which is formed with a curved end portion 16 which lies under the lever 12, the latter being adapted to slide over the curved end of the bell crank lever 15 as the steering wheel is turned to one side or the other. The lever 15 is pivotally mounted at 17 on a fulcrum post 18 which is fastened rigidly to the axle 19 at 20.

In the preferred embodiment of this invention, I employ a tubular rock shaft 21 journaled in bearings in the side frame bars 22 of the chassis and provided at the opposite extremities thereof with tubular or channeled arms 23. Extending through the tubular rock shaft 21 and the arms 23 thereof is a flexible compensating cable 24 the end portions of which pass around guide pulleys 25 fastened to the machine frame as shown. The extremities of the cable 24 are connected to the upper arms of the bell crank levers 15 as shown at 26. The cable 24 is adapted to slide relatively to the rock shaft 21 and the arms 23 for the purpose of producing an equal pull on the levers 15, thereby effecting a corresponding tension on the brake band and therefore an equalization of braking pressure on the drums of the steering wheels.

The flexible cable 24 by reason of its slidable relation to the rock shaft 21 and its arms 23 compensates for the varying positions of the bell crank levers 15, it being apparent that as the steering wheels are turned in one direction or the other, the toggle levers 12 are slid over the curved end portions 16 of the levers 15 thereby varying the positions of said bell crank levers.
Owing to the ability of the flexible cable to slidingly adjust itself in relation to the rock shaft 21 and its arms 23, an equal pull is thus obtained on both of the levers 15 irrespective of the angles assumed by the steering wheels during the operation of the machine.

The rock shaft 21 may be manually controlled by means of a hand lever 27 or a foot lever or pedal 28 or by both, according to the desire of the manufacturer.

If desired, the fulcrum post 18 may be formed with an arm 29 to receive the pivot pin or bolt 30 of the steering knuckle, said arm 29 serving as a brace for the fulcrum post.

Instead of employing the tubular rock shaft and its arms and the flexible cable, as hereinabove described, I may use the rock shaft 31 as illustrated in Figs. 7, 8 and 9, said rock shaft being provided with arms 32 from which connecting rods 33 provided with take up turn buckles 34 extend to and connect with bell crank levers 35 pivotally mounted at 36 on supporting brackets 37 fastened to the machine frame as shown in Fig. 7. Upwardly offset links 38 connect the bell crank levers 35 with clevises 39 pivotally connected to the upper arms of the bell crank levers 15 hereinabove described.

From the foregoing description, taken in connection with the accompanying drawings, the operation of the brake mechanism will now be understood. When the rock shaft is operated under the arrangement shown for example in Fig. 1, both end portions of the cable 24 are drawn around the pulleys 25 and serve to rock the bell crank levers 15 which in turn lift the toggle levers 12, the latter serving to contract the brake bands 9 and effect an application of the brakes. In this operation, the cable is adapted to slide relatively to the rock shaft 21 and its arms 23 thereby equalizing the pull on the levers 15, resulting in an equalized gripping action of the brake bands on their respective drums. By reason of the fact that the brake bands are supported directly upon the steering knuckles, the turning of the steering wheels results in an equal turning of the brake drums and brake bands and therefore the drums and bands are always maintained in perfect working relation to each other. The brake mechanism above described adds greatly to the safety of the machine, enabling the same to be brought to a stop in a shorter distance as compared with the present day automobile construction in which only the rear wheels of the machine are equipped with brakes.

Having thus described my invention, I claim:—

1. Brake mechanism for the steering wheel of a motor vehicle, comprising a brake drum secured in fixed relation to the steering wheel, a steering knuckle on which the steering wheel is mounted having oppositely extending supporting arms, a brake band having laterally projecting lugs supported by the arms of said steering knuckle whereby the brake band is maintained in working relation to the latter by the steering knuckle, and operating connections for causing said brake band to frictionally engage the brake drum.

2. Brake mechanism for the steering wheel of a motor vehicle, comprising a brake drum secured in fixed relation to the steering wheel, a steering knuckle on which the steering wheel is mounted, a brake band supported by said steering knuckle and adapted to engage said brake drum and be maintained in working relation to the latter by the steering knuckle, operating connections for causing said brake band to frictionally engage the brake drum, said operating connections comprising a toggle lever having one end of the brake band connected thereto, a link connecting the opposite end of the brake band to said toggle lever, and means relatively to which said toggle lever is slidable for moving the free end of the toggle lever away from the brake drum.

3. Brake mechanism for the steering wheel of a motor vehicle, comprising a brake drum secured in fixed relation to the steering wheel, a steering knuckle on which the steering wheel is mounted, a brake band supported by said steering knuckle and adapted to engage said brake drum to be maintained in working relation to the latter by the steering knuckle, operating connections for causing said brake band to frictionally engage the brake drum, said operating connections comprising a toggle lever having one end of the brake band connected thereto, a link connecting the opposite end of the brake band to said toggle lever, and means for moving the free end of the toggle lever away from the brake drum, the last named means consisting of a lever the fulcrum of which bears a fixed relation to the axle by which said knuckle is carried.

4. Brake mechanism for the steering wheel of a motor vehicle, comprising a brake drum secured in fixed relation to the steering wheel, a steering knuckle on which the steering wheel is mounted, a brake shoe supported by said steering knuckle and adapted to engage said brake drum and be maintained in working relation to the latter by the steering knuckle, and brake operating connections comprising a shoe-operating toggle lever, and means relatively to which said toggle lever is slidable for moving the free end of the toggle lever away from the brake drum.

In testimony whereof I affix my signature in presence of two witnesses.

JOHN C. FLICKINGER.

Witnesses:
HOWARD SEABOLDT,
JAMES G. HORN.